(12) United States Patent
Slopsema et al.

(10) Patent No.: US 7,794,345 B2
(45) Date of Patent: Sep. 14, 2010

(54) DUAL BACKLASH CHAIN TENSIONER

(75) Inventors: Thomas A. Slopsema, Holt, MI (US); David C. Derby, Windsor Locks, CT (US)

(73) Assignee: GM Global Technology Operations, Inc., Detroit, MI (US)

( * ) Notice: Subject to any disclaimer, the term of this patent is extended or adjusted under 35 U.S.C. 154(b) by 688 days.

(21) Appl. No.: 11/233,735

(22) Filed: Sep. 23, 2005

(65) Prior Publication Data

US 2007/0072713 A1 Mar. 29, 2007

(51) Int. Cl.
*F16H 7/08* (2006.01)
*F16H 7/22* (2006.01)

(52) U.S. Cl. .................... 474/109; 474/110; 474/111

(58) Field of Classification Search .......... 474/109–111
See application file for complete search history.

(56) References Cited

U.S. PATENT DOCUMENTS

| 3,710,634 | A | * | 1/1973 | Tamaru et al. ............ 474/111 |
| 4,822,320 | A | * | 4/1989 | Suzuki .................... 474/111 |
| 5,006,095 | A | * | 4/1991 | Suzuki .................... 474/111 |
| 5,073,150 | A | * | 12/1991 | Shimaya .................. 474/110 |
| 5,908,363 | A | * | 6/1999 | Suzuki .................... 474/101 |
| 6,059,678 | A | | 5/2000 | Suzuki |
| 6,062,999 | A | * | 5/2000 | Suzuki et al. ............. 474/111 |
| 6,478,703 | B2 | | 11/2002 | Suzuki |
| 6,849,015 | B2 | * | 2/2005 | Markley et al. ........... 474/111 |
| 2002/0019282 | A1 | * | 2/2002 | Namie et al. ............. 474/109 |
| 2002/0098932 | A1 | * | 7/2002 | Hashimoto et al. ........ 474/110 |

FOREIGN PATENT DOCUMENTS

JP 60121355 (A) * 6/1985

* cited by examiner

*Primary Examiner*—Bradley T King
*Assistant Examiner*—Mahbubur Rashid

(57) ABSTRACT

A dual backlash tensioner includes a support having a recess therein. A plunger is slidable in the recess and includes a shoe extending outward from the recess. A first resilient member acts between the support and the plunger and urges the shoe outwardly. An oscillatable stop cam having first and second teeth spacedly disposed thereon is engagable with the plunger. The stop cam is pivotally mounted on the support. A second resilient member urges the first tooth toward engagement with the plunger. The plunger has a control portion opposing the stop cam that includes a toothed rack and an adjoining depression positioned toward the shoe. The stop cam teeth are adapted to engage the toothed rack.

16 Claims, 3 Drawing Sheets

DUAL BACKLASH CHAIN TENSIONER

TECHNICAL FIELD

This invention relates to chain drives and, more particularly, to external plunger rack chain tensioners.

BACKGROUND OF THE INVENTION

It is known in the art relating to chain drives to use chain guides and tensioners to control undesired lateral chain motion and to hold the chain on the drive and driven sprockets. A new chain as installed may have a minimum of slack so that it is not likely to skip a sprocket tooth in operation. However, during long service, the chain length increases, requiring the tensioner to take up the slack to prevent tooth skipping.

In one tensioner design, the tensioner includes a ratcheting stop cam and a plunger having an external plunger rack. The plunger rack includes teeth, which the cam engages to act as a stop against retracting motions of the plunger. The pitch of the ratchet in the tensioner is set to allow a small, given tensioner backlash to prevent worn (i.e., long) chains from skipping on a sprocket. On the other hand, we have found that when a new chain is still short and taut, the chain dynamics may cause the tensioner stop cam to advance an extra ratchet tooth too soon. This condition can cause increased chain tension and resulting "chain whine" noise. Worn chains run quieter for whine, so the tensioner advancing an extra tooth (i.e., over-ratcheting) does not lead to a whine issue.

SUMMARY OF THE INVENTION

The present invention provides a dual backlash tensioner that operates with large backlash values for engines with new chains and that changes to standard small backlash values as the chain wears and elongates. The tensioner of the present invention initially prevents over-ratcheting of new chains by functioning as a no-ratchet tensioner with large backlash values, thereby decreasing the occurrence of chain whine noise. Since new chains can tolerate large backlash values without tooth skipping, these large backlash values are beneficial. As the chain wears and elongates, the tensioner of the present invention begins to function as a ratchet tensioner, continuing to tension the chain while preventing chain skipping. In essence, the tensioner of the present invention provides controlled, sufficient tensioning of a new chain without over-tensioning the new chain, and does not begin to ratchet until the chain becomes worn and elongated.

In an exemplary embodiment, a dual backlash tensioner in accordance with the present invention may include a support having a recess therein. A plunger is slidable in the recess and includes a shoe extending outward from the recess. A resilient member acts between the support and the plunger and urges the shoe outwardly. A latch, in the form of an oscillatable stop cam having first and second spaced teeth, is engagable with the plunger. The stop cam is pivotally mounted on the support. A resilient member urges the first tooth toward engagement with the plunger. The plunger has a control portion opposing the stop cam. The control portion includes a toothed rack and an adjoining depression positioned toward the shoe. With a new shorter chain, the first cam tooth slides on the depression and the plunger freely extends and retracts to take up chain slack with a large backlash. When the chain lengthens with wear, the stop cam teeth are adapted to engage the rack teeth and the chain is controlled with smaller controlled backlash.

These and other features and advantages of the invention will be more fully understood from the following description of certain specific embodiments of the invention taken together with the accompanying drawings.

DESCRIPTION OF AN EXEMPLARY EMBODIMENT

Figure 1:
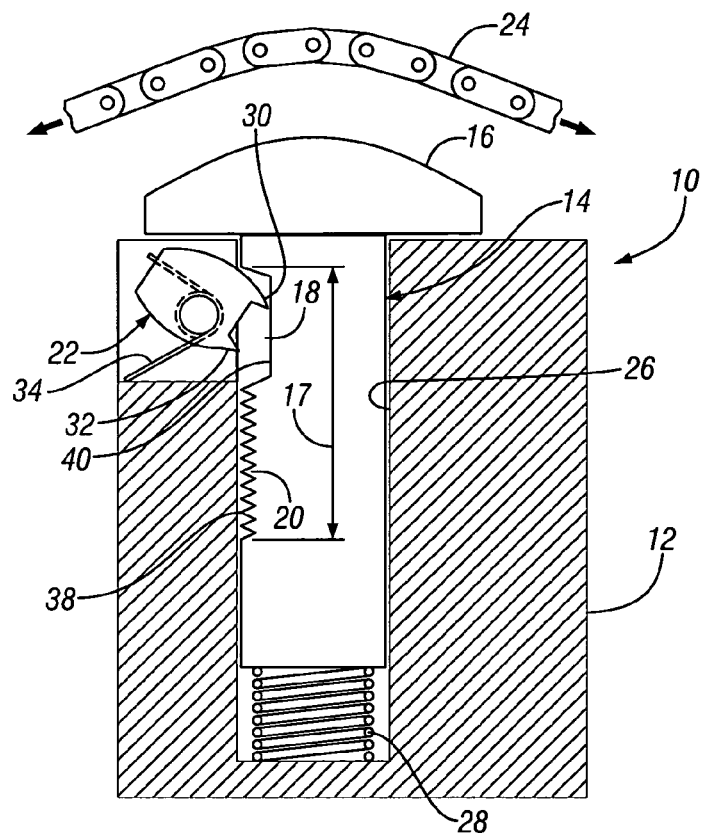
FIG. 1 is a cross-sectional side view of a dual backlash tensioner according to the invention shown in a retracted position.

Referring now to the drawings in detail, numeral 10 generally indicates a dual backlash tensioner in accordance with the present invention. The tensioner 10 includes a support 12 and a plunger 14 slidable about the support. The plunger 14 includes a shoe 16 which may generally be an end portion of the plunger 14. The plunger 14 also includes a control portion 17 including no-ratchet zone 18 and ratchet zone 20.

A toothed latch, such as a stop cam 22, is engagable with the zones and operative to provide relatively larger backlash values when engaging the no-ratchet zone 18 and relatively smaller backlash values when engaging the ratchet zone 20. In other words, when the tensioner 10 operates in the no-ratchet zone 18 of the plunger 14, the tensioner allows a much greater backlash than when operating in the ratchet zone 20.

Backlash is generally a distance which the plunger 14 may fluctuate/retract while the tensioner 10 tensions an endless member such as a chain 24 or similar member via the shoe 16. In FIG. 1, the plunger 14 is shown in a fully retracted position in which it might be held when installing a new chain 24. The shoe 16 is spaced from the tensioned position of the new chain 24 to show clearance representing the available backlash.

More particularly, with reference to FIG. 1, the support 12 of the tensioner 10 has a recess 26 therein. A first resilient member 28, such as a compression spring or similar device, acts between the support 12 and the plunger 14, urging the shoe portion 16 of the plunger outwardly. The first resilient member 28 may be disposed in the recess 26 and may act on the plunger 14 at an end opposite the shoe 16. Alternatively, the resilient member 28 may be disposed outside of the recess 26 and may act directly on the shoe portion 16 of the plunger 14. The plunger 14 is slidable in the recess 26, biased by the first resilient member 28.

The stop cam 22 is oscillatable and has first and second teeth 30, 32 spacedly disposed thereon and engagable with the plunger 14. The stop cam 22 is pivotally mounted on the support 12. A second resilient member 34, such as a coil spring, torsion spring or similar device, urges the first tooth 30 toward engagement with the plunger 14. The plunger 14 includes a control portion 17 opposing the stop cam 22.

The control portion 17 includes a longitudinally extending toothed rack 38 and an adjoining longitudinal depression 40 positioned toward the shoe 16. In this embodiment, the control portion 17 includes both the no-ratchet zone 18 and the ratchet zone 20, the no-ratchet zone 18 including the depression 40 and the ratchet zone 20 including the toothed rack 38. The stop cam teeth 30, 32 are adapted to engage the toothed rack 38 in order to control ratcheting of the plunger 14.

The depression 40 may be proximate the shoe portion 16 and the bottom of the depression 40 may be generally planar. It should be understood, however, that the depression 40 need not be perfectly flat. The depression 40 only should be free of protrusions that would engage the cam teeth 30, 32. The depression 40 may also have a length equal, for example, to a length of four of the teeth of the toothed rack 38. The length of the depression 40 determines the magnitude of backlash provided by the no-ratchet zone 18 of the control portion 17, as is described in more detail below. The length of the depression 40 may be varied to establish the amount of backlash provided by the no-ratchet zone 18. The depression 40 must have a depth that is greater than the depth of the teeth of the toothed rack 38. The depression 40 must be deep enough so that the second cam tooth 32 does not become engaged with the toothed rack 38 before the first cam tooth 30 becomes engaged with the toothed rack.

The teeth of the toothed rack 38 should have generally equal pitch and be generally evenly spaced. Variable rack pitch and uneven tooth spacing, though possible, are not desirable as these arrangements lead to only one cam tooth of the two cam teeth 30, 32 being loaded at a time, instead of equal sharing of the load between the cam teeth 30, 32. Such arrangements therefore may lead to excessive loading of the cam teeth 30, 32. The rack pitch is generally set to allow for a given, small tensioner backlash less than that available in the no-ratchet zone 18.

Figure 5:
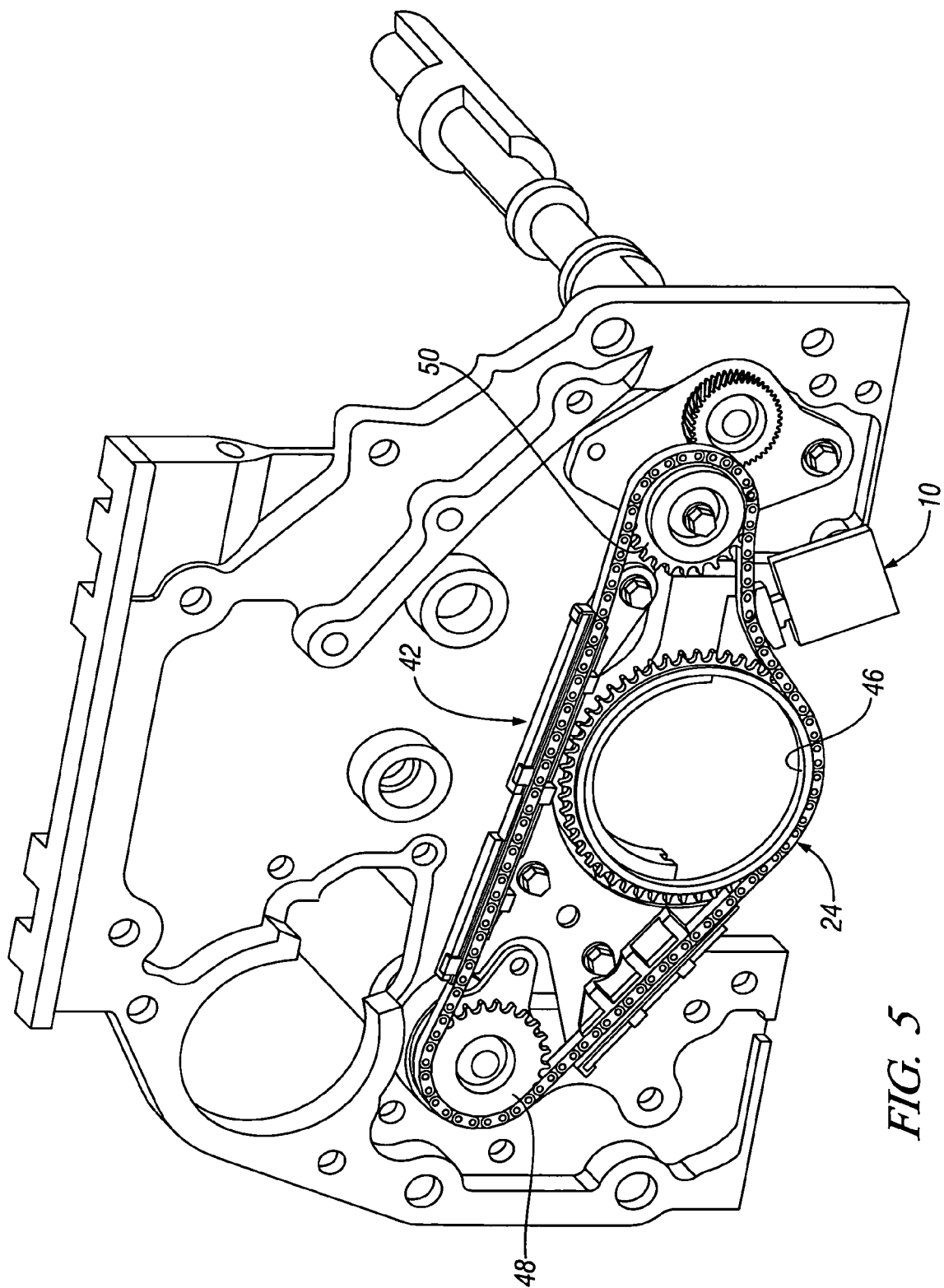
FIG. 5 is a perspective view of the tensioner of FIG. 1 tensioning a balancer chain drive of an internal combustion engine.

Turning next to FIG. 5, there is shown an exemplary application of the backlash tensioner 10 to an engine balancer drive 42 to tension a balancer drive chain 24 of an internal combustion engine. It should be understood, however, that the tensioner 10 may be used to tension chains in other similar applications.

The balancer drive arrangement 42 generally includes the drive chain 24, the tensioner 10, a drive sprocket 46, such as a crank sprocket, and first and second driven sprockets 48, 50 connected with balancer shafts, not numbered. The drive chain 24 may be an inverted tooth chain or other suitable chain or endless drive member.

The crank sprocket 46 is mounted on and rotatable with an engine crankshaft (not shown) adjacent a rear end thereof. The drive chain 24 engages the crank sprocket 46, and sequentially, the driven sprockets 48, 50. Rotation of the crank sprocket 46 directly drives the first driven sprocket 48 and drives the second driven sprocket 50 via the first driven sprocket. The drive chain 24 may therefore exhibit slack between the crank sprocket 46 and the second driven sprocket 50. Thus, the tensioner 10 is located between the crank sprocket 46 and the second driven sprocket 50 to take up this slack.

Figure 2:
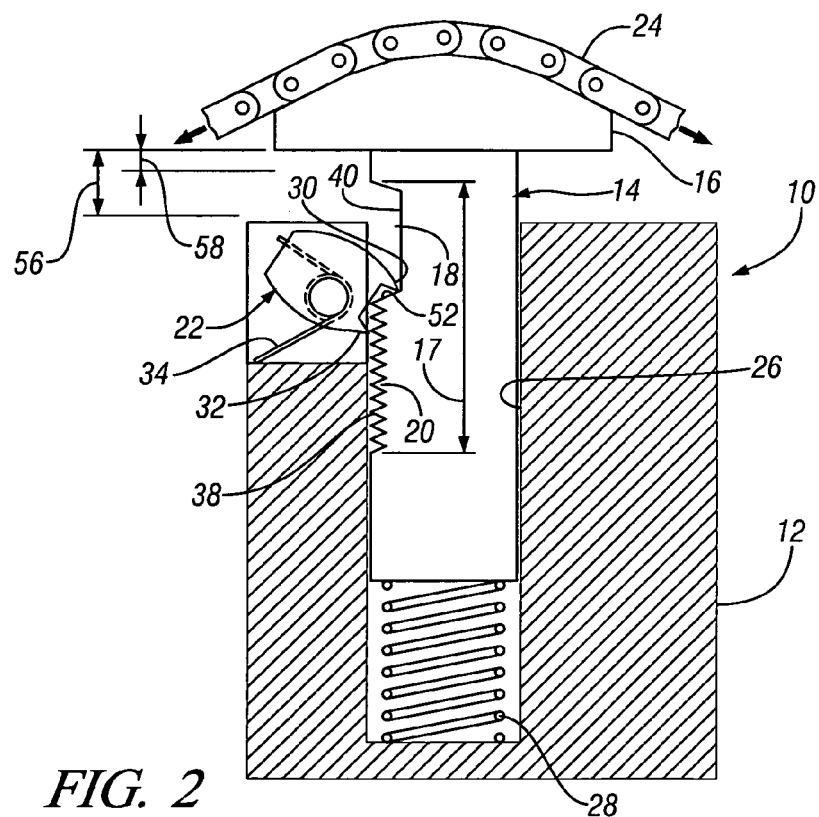
FIG. 2 is a view similar to FIG. 1 with the tensioner shown in a no-ratchet position as engaging a new chain.
Figure 3:
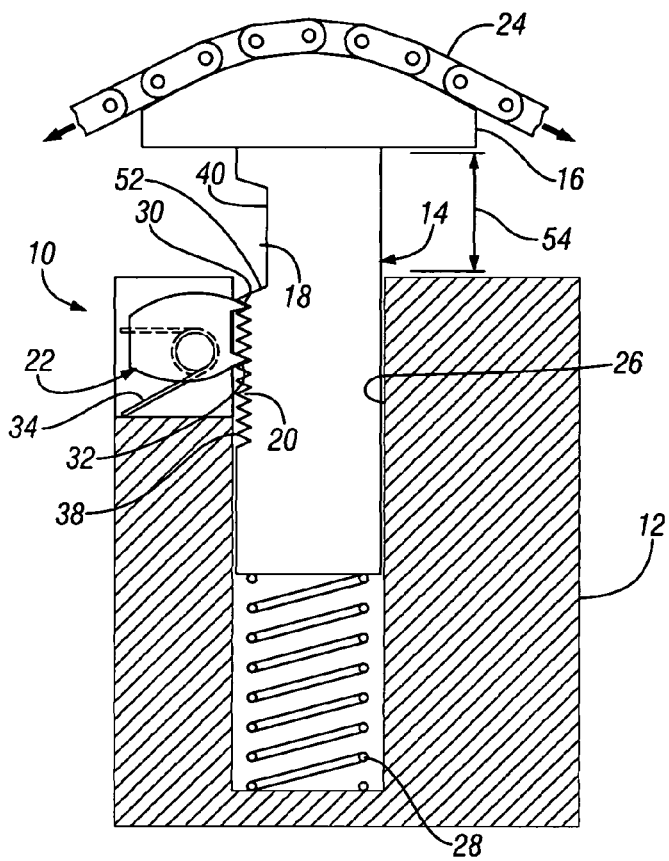
FIG. 3 is a similar view of the tensioner shown extended to a ratchet position as engaging a stretched chain.
Figure 4:
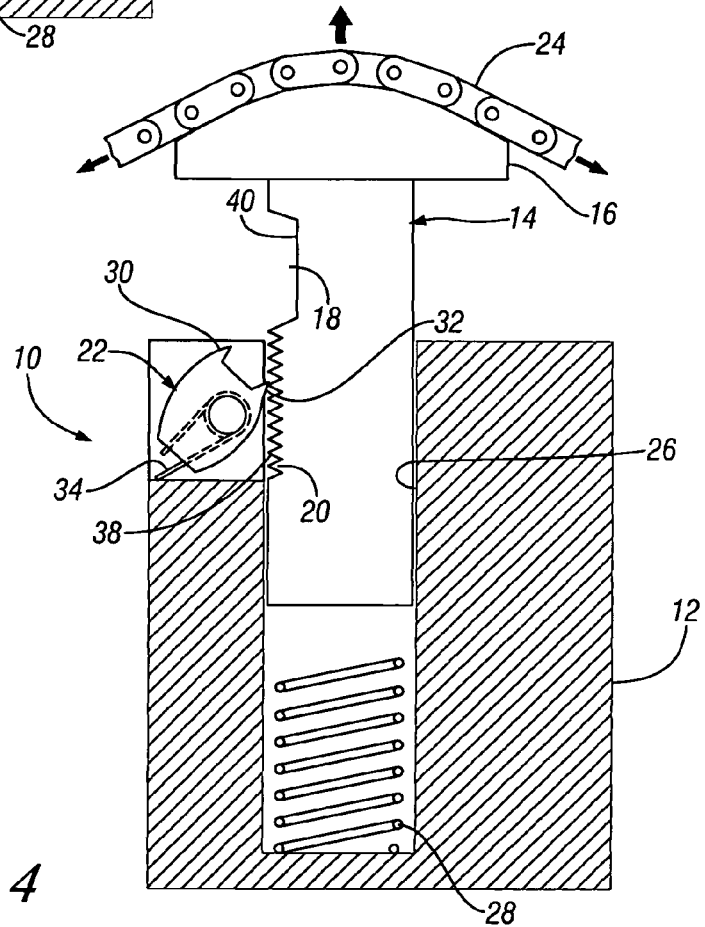
FIG. 4 is a similar view of the tensioner shown advancing in a ratchet zone.

Referring to FIGS. 2-4, the general operation of the dual backlash tensioner 10 is as follows. The initial position of the tensioner with the chain 24 when newly installed is always between that shown in FIGS. 1 and 2. In FIG. 2, the first resilient member 28 urges the plunger 14 outwardly away from the support 12. The shoe 16 of the plunger 14 engages the chain 24, and the force of the chain 24 against the shoe 16 counters the outward force provided by the first resilient member 28. The second resilient member 34 urges the first stop cam tooth 30 toward the plunger 14. During an initial portion of the service life of the chain 24, the tensioner 10 operates in the no-ratchet zone 18. During this time, the first stop cam tooth 30 may engage the depression 40, and the plunger 14 freely slides inward and outward in the recess 26 of the support 12.

This free sliding motion provides the tensioner with much greater backlash than when operating in the ratchet zone 20 ("ratchet backlash"). When a new chain 24 is in use, the chain is shorter and the tensioner 10 extends only a relatively short distance out of the support 12 to engage and tension the chain 24. The backlash available is the full distance that the plunger extends out of the support 12, since only the spring (resilient member 28) prevents the plunger 14 from being fully retracted to the position shown in FIG. 1. Thus, the spring exclusively provides tension on the chain 24 without over tensioning the chain. As seen in FIG. 2, the tensioner 10 is capable of providing this large tensioner backlash without becoming "locked" on a ratchet tooth, which could result in the chain 24 becoming over-tensioned and potentially producing chain whine noise.

Turning to FIG. 3, as the chain 24 wears, it stretches or becomes longer, so the plunger 14 of the tensioner 10 extends farther out of the support 12 to maintain tension on the chain. As the plunger 14 extends beyond the position of FIG. 2, the first tooth 30 of the stop cam 22 slides up an angular face 52 of the depression 40 until the teeth 30, 32 of the stop cam 22 engage outer teeth of the rack 38 as shown in FIG. 3. At this point, the plunger 14 is "locked" by the stop cam 22 against being retracted. From this point forward, the tensioner 10 operates in the ratchet zone 20 to tension the chain 24 while limiting the backlash to prevent the chain from skipping a tooth on the drive sprocket 46. However, the plunger 14 remains free to ratchet further outward to tension the chain 24 as it continues to wear and stretch.

FIG. 4 shows the action of the lock cam as it ratchets from the position of FIG. 3 to the next further inward tooth position of the rack. As the inner tooth 32 snaps into the next tooth valley, the cam is positioned so that only a small retraction of the plunger 14 will engage both teeth to again stop retraction of the plunger, but at the next tooth position. As shown in FIG. 3, dimension 54 shows the change in position between the plunger 14 at maximum retraction (FIG. 1) and just before the first tooth of the toothed rack 38 of the plunger engages the first stop cam tooth 30 (FIG. 3) and defines the maximum tensioner backlash provided by the no-ratchet zone 18 of the tensioner 10. For comparison, dimension 56 of FIG. 2 shows the available backlash with a new chain and dimension 58 shows the ratchet backlash while operating in the ratchet zone 20 (FIGS. 3 and 4).

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A dual backlash tensioner comprising:
a support having a recess therein;
a plunger slidable in the recess and connecting with a shoe extending outward from the recess;
a first resilient member acting between the support and the plunger and urging the shoe outwardly;
an oscillatable stop cam having first and second spaced teeth and engagable with the plunger, said stop cam being pivotally mounted on the support; and
a second resilient member urging the first tooth toward engagement with the plunger;

said plunger having a control portion opposing the stop cam, the control portion including a toothed rack, and an adjoining depression positioned longitudinally toward the shoe;

wherein, a first backlash position includes the stop cam first tooth extending into the control portion depression and the plunger being retracted into the recess such that the plunger is free to move longitudinally relative to the first tooth and without limiting backlash of an associated chain having a first service length; and wherein a second backlash position includes the plunger being extended longitudinally from the recess and the stop cam teeth being operative to engage the toothed rack to form a ratcheting device configured to limit excessive backlash of the associated chain such that a second service length of the chain is greater than the first service length.

2. The dual backlash tensioner of claim 1, wherein the depression is proximate the shoe.

3. The dual backlash tensioner of claim 1, wherein the depression has a generally planar lower surface.

4. The dual backlash tensioner of claim 1, wherein a length of the depression is at least equal to a length of four of the rack teeth.

5. The dual backlash tensioner of claim 1, wherein a depth of the depression is at least that of the rack teeth.

6. The dual backlash tensioner of claim 1, wherein the rack teeth have generally equal pitch.

7. The dual backlash tensioner of claim 1, wherein the rack teeth are evenly spaced.

8. The dual backlash tensioner of claim 1, wherein the first resilient member is a compression spring.

9. The dual backlash tensioner of claim 1, wherein the second resilient member is one of a coil spring and a torsion spring.

10. A dual backlash tensioner comprising:

a support;

a plunger longitudinally slidable about the support and connecting with a shoe;

said plunger including a no-ratchet zone and a ratchet zone aligned longitudinally on the plunger with the no ratchet zone disposed longitudinally between the ratchet zone and the shoe; and a single unitary toothed latch pivotally mounted on the support and sequentially operating in each of said zones as the plunger slides about the support;

the support, the plunger, the shoe and the latch comprising operative elements of the dual backlash tensioner that provide relatively larger backlash when the plunger is operating in the no-ratchet zone and relatively smaller backlash when the plunger is operating in the ratchet zone.

11. The dual backlash tensioner of claim 10, wherein the no-ratchet zone is a flat depression.

12. The dual backlash tensioner of claim 10, wherein the no-ratchet zone is proximate the shoe.

13. The dual backlash tensioner of claim 10, wherein the ratchet zone includes a plurality of teeth, the latch being engagable with the teeth.

14. The dual backlash tensioner of claim 10, wherein the ratchet zone includes a toothed rack on the plunger, and teeth of the toothed latch coact with teeth of the rack to form a ratchet device that operates to limit backlash in the ratchet zone.

15. The dual backlash tensioner of claim 14 wherein the number of teeth in the toothed latch is limited to first and second spaced teeth.

16. The dual backlash tensioner of claim 10 wherein the shoe is mounted on the plunger.

\* \* \* \* \*